(12) United States Patent
Shimada et al.

(10) Patent No.: US 12,428,576 B2
(45) Date of Patent: Sep. 30, 2025

(54) COATING COMPOSITION FOR OPTICAL ARTICLE, SPECTACLE LENS, SPECTACLES, AND METHOD FOR PRODUCING SPECTACLE LENS, AND OPTICAL ARTICLE AND METHOD FOR PRODUCING OPTICAL ARTICLE

(71) Applicants: Takuya Shimada, Tokyo (JP); Teruo Yamashita, Tokyo (JP)

(72) Inventors: Takuya Shimada, Tokyo (JP); Teruo Yamashita, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 965 days.

(21) Appl. No.: 17/598,699

(22) PCT Filed: Mar. 27, 2020

(86) PCT No.: PCT/JP2020/014263
§ 371 (c)(1),
(2) Date: Sep. 27, 2021

(87) PCT Pub. No.: WO2020/203864
PCT Pub. Date: Oct. 8, 2020

(65) Prior Publication Data
US 2022/0186064 A1   Jun. 16, 2022

(30) Foreign Application Priority Data

Mar. 29, 2019 (JP) .................................. 2019-067807

(51) Int. Cl.
C09D 133/08 (2006.01)
G02C 7/10 (2006.01)

(52) U.S. Cl.
CPC .......... C09D 133/08 (2013.01); G02C 7/102 (2013.01)

(58) Field of Classification Search
CPC .............. C08F 222/103; C08F 222/102; C08F 230/085; C08K 5/0041; C08K 5/1545; C09D 133/08; C09D 133/10; C09D 4/00; C09D 5/002; C09D 5/022; C09K 9/02; G02B 1/10; G02B 5/23; G02C 7/102
See application file for complete search history.

(56) References Cited

U.S. PATENT DOCUMENTS

| | | | |
|---|---|---|---|
| 2002/0107350 A1 | 8/2002 | Widawski et al. | |
| 2004/0220292 A1 | 11/2004 | Momoda et al. | |
| 2005/0089630 A1 | 4/2005 | Schlunt et al. | |
| 2013/0015416 A1* | 1/2013 | Takenaka | C08F 2/44 252/582 |
| 2020/0142220 A1* | 5/2020 | Shimada | G02B 1/14 |

FOREIGN PATENT DOCUMENTS

| | | |
|---|---|---|
| CN | 103906774 A | 7/2014 |
| EP | 2 554 624 A1 | 2/2013 |
| EP | 2 733 155 A1 | 5/2014 |
| EP | 2 190 652 B1 | 10/2015 |
| EP | 3 418 347 A1 | 12/2018 |
| JP | 2000-008032 A | 1/2000 |
| JP | 2008-058932 A | 3/2008 |
| JP | 2015-025063 A | 2/2015 |
| JP | 2017-052869 A | 3/2017 |
| WO | 2003/011967 A1 | 2/2003 |
| WO | 2013/058218 A1 | 4/2013 |
| WO | 2013/161642 A1 | 10/2013 |
| WO | WO-2019189855 A1 * | 10/2019 ............... G02B 1/14 |

OTHER PUBLICATIONS

May 30, 2022 Office Action issued in Chinese Patent Application No. 202080024623.6.
Dec. 20, 2021 Office Action issued in Chinese Patent Application No. 202080024623.6.
Dec. 19, 2022 Extended Search Report issued in European Patent Application No. 20782217.2.
Jun. 16, 2020 International Search Report issued in International Patent Application No. PCT/JP2020/014263.
Jun. 16, 2020 Written Opinion issued in International Patent Application No. PCT/JP2020/014263.
Sep. 28, 2021 International Preliminary Report on Patentability issued in International Patent Application No. PCT/JP2020/014263.

* cited by examiner

*Primary Examiner* — Ana L. Woodward
(74) *Attorney, Agent, or Firm* — Oliff PLC

(57) ABSTRACT

A coating composition for an optical article containing a photochromic compound and two or more (meth)acrylates, the two or more (meth)acrylates containing an alicyclic difunctional (meth)acrylate and a non-cyclic tri- or higher functional (meth)acrylate.

15 Claims, 2 Drawing Sheets

COATING COMPOSITION FOR OPTICAL ARTICLE, SPECTACLE LENS, SPECTACLES, AND METHOD FOR PRODUCING SPECTACLE LENS, AND OPTICAL ARTICLE AND METHOD FOR PRODUCING OPTICAL ARTICLE

TECHNICAL FIELD

The present invention relates to a coating composition for an optical article, a spectacle lens, spectacles, and a method for producing the spectacle lens, and an optical article and a method for producing the optical article.

BACKGROUND ART

A photochromic compound is a compound having a property (photochromic properties) of developing color under irradiation with light in a wavelength range having photoresponsiveness and fading under non irradiation. Examples of a method for imparting photochromic properties to an optical article such as a spectacle lens include a method of providing a coating containing a photochromic compound and a curable compound on a substrate and then curing this coating to form a cured layer (photochromic layer) having photochromic properties (see, for example, Patent Literature 1).

CITATION LIST

Patent Literature

Patent Literature 1: WO 2003/011967

SUMMARY OF INVENTION

Technical Problem

The properties desired for the optical article having photochromic properties as described above include a high response speed to light (excellent photoresponsiveness). In addition, such an optical article is also desired to have high color density when developing color upon receiving light irradiation.

An aspect of the present invention provides a coating composition for an optical article capable of forming a photochromic layer having excellent photoresponsiveness and capable of developing color at a high density.

Solution to Problem

An aspect of the present invention relates to
a coating composition for an optical article (hereinafter, also simply referred to as a "composition"), containing:
  a photochromic compound; and
  two or more (meth)acrylates, wherein
  the two or more (meth)acrylates contain
  an alicyclic difunctional (meth)acrylate, and
  a non-cyclic tri- or higher functional (meth)acrylate.

The coating composition for an optical article contains, as a (meth)acrylate, an alicyclic difunctional (meth)acrylate and a non-cyclic tri- or higher functional (meth)acrylate. Thus, in the photochromic layer formed by curing this composition, the photochromic compound can exhibit excellent photoresponsiveness, and can develop color at a high density upon receiving light irradiation.

Advantageous Effects of Invention

According to an aspect of the present invention, it is possible to provide a coating composition for an optical article capable of forming a photochromic layer having excellent photoresponsiveness and capable of developing color at a high density upon receiving light irradiation. According to another aspect of the present invention, it is possible to provide a spectacle lens having a photochromic layer, the spectacle lens having excellent photoresponsiveness and capable of developing color at a high density upon receiving light irradiation.

DESCRIPTION OF EMBODIMENTS

[Coating Composition for Optical Article]

Figure 1:
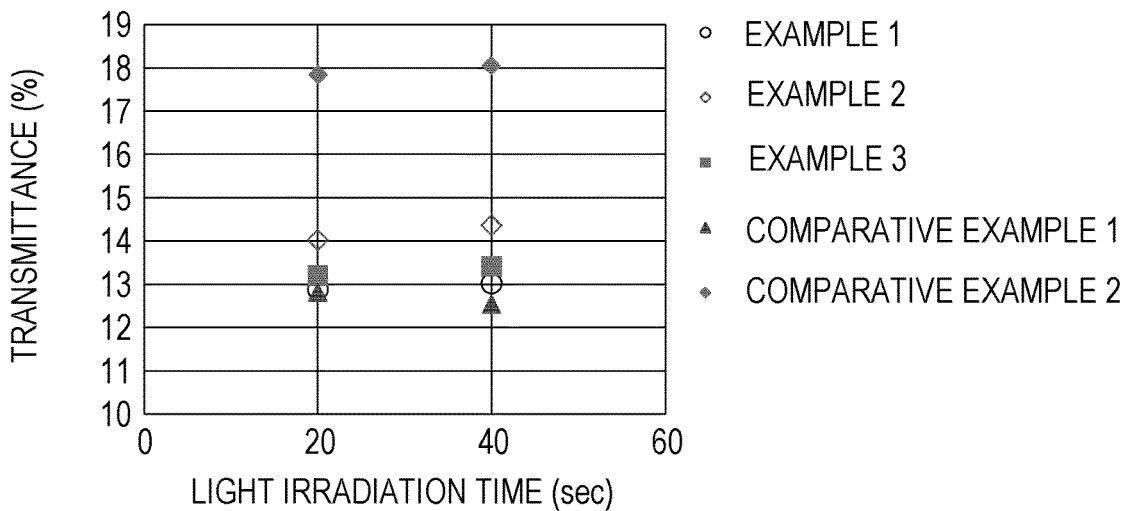
FIG. 1 shows evaluation results of color density in Examples and Comparative Examples.

A coating composition for an optical article according to an aspect of the present invention contains a photochromic compound and two or more (meth)acrylates. These components will be further described in detail below.

<(Meth)acrylate>

In the present invention and the present specification, the term "(meth)acrylate" is used in the meaning of encompassing acrylate and methacrylate. The "acrylate" is a compound having one or more acryloyl groups in one molecule. The "methacrylate" is a compound having one or more methacryloyl groups in one molecule. In the present invention and the present specification, the term "methacrylate" refers to those containing only a methacryloyl group as a (meth)acryloyl group, and those containing both an acryloyl group and a methacryloyl group as a (meth)acryloyl group are referred to as an "acrylate". The acryloyl group may be contained in the form of an acryloyloxy group, and the methacryloyl group may be contained in the form of a methacryloyloxy group. The term "(meth)acryloyl group" described below is used to mean to encompass an acryloyl group and a methacryloyl group. The term "(meth) acryloyloxy group" is used to mean to encompass an acryloyloxy group and a methacryloyloxy group. In addition, unless otherwise specified, the group described may have a substituent or may be unsubstituted. When a group has a substituent, examples of the substituent include an alkyl group (for example, an alkyl group having 1 to 6 carbon atoms), a hydroxyl group, an alkoxy group (for example, an alkoxy group having 1 to 6 carbon atoms), a halogen atom (for example, a fluorine atom, a chlorine atom, or a bromine atom), a cyano group, an amino group, a nitro group, an acyl group, and a carboxyl group. In addition, the expression "number of carbon atoms" in the group having a substituent means the number of carbon atoms of a portion not containing a substituent.

The composition contains two or more (meth)acrylates. One of them is an alicyclic difunctional (meth)acrylate, and the other is a non-cyclic tri- or higher functional (meth) acrylate. The alicyclic difunctional (meth)acrylate refers to a compound having an alicyclic structure and having two (meth)acryloyl groups contained in one molecule. In the present invention and the present specification, the term "non-cyclic" means not containing a cyclic structure. On the other hand, the term "cyclic" means containing a cyclic structure. The non-cyclic tri- or higher functional (meth) acrylate refers to a compound not containing a cyclic structure and having three or more (meth)acryloyl groups contained in one molecule. Inclusion of these compounds is presumed to be the reason why the photochromic layer formed from this composition can develop color at a high density upon receiving light irradiation and can exhibit excellent photoresponsiveness.

(Alicyclic Difunctional (Meth)acrylate)

The alicyclic difunctional (meth)acrylate can be, for example, a compound having a structure represented by $R^1\text{-}(L^1)\,n1\text{-}Q\text{-}(L^2)\,n2\text{-}R^2$. Here, Q represents a divalent alicyclic group, $R^1$ and $R^2$ each independently represent a (meth)acryloyl group or a (meth)acryloyloxy group, $L^1$ and $L^2$ each independently represent a linking group, and n1 and n2 each independently represent 0 or 1. The divalent alicyclic group represented by Q is preferably an alicyclic hydrocarbon group having 3 to 20 carbon atoms. Examples thereof include a cyclopentylene group, a cyclohexylene group, a cycloheptylene group, a cyclooctylene group, a tricyclodecanylene group, and an adamantylene group. Examples of the linking group represented by $L^1$ and $L^2$ include an alkylene group. The alkylene group can be, for example, an alkylene group having 1 to 6 carbon atoms.

Specific examples of the alicyclic difunctional (meth) acrylate include cyclohexanedimethanol di(meth)acrylate, ethoxylated cyclohexanedimethanol di(meth)acrylate, propoxylated cyclohexanedimethanol di(meth)acrylate, ethoxylated propoxylated cyclohexanedimethanol di(meth) acrylate, tricyclodecanedimethanol di(meth)acrylate, ethoxylated tricyclodecanedimethanol di(meth)acrylate, propoxylated tricyclodecanedimethanol di(meth)acrylate, and ethoxylated propoxylated tricyclodecanedimethanol di(meth)acrylate. The molecular weight of the alicyclic difunctional (meth)acrylate can be, for example, in the range of 200 to 400, but is not limited to this range. In the present invention and the present specification, as the molecular weight of the polymer, a theoretical molecular weight calculated from a structural formula determined by structural analysis of the compound or a raw material charging ratio in the production is employed. The alicyclic difunctional (meth)acrylate may contain, as a (meth)acryloyl group, only an acryloyl group, only a methacryloyl group, or an acryloyl group and a methacryloyl group. In an aspect, the alicyclic difunctional (meth)acrylate preferably contains only a methacryloyl group as a (meth)acryloyl group, that is, the alicyclic difunctional (meth)acrylate is preferably methacrylate.

(Non-Cyclic Tri- or Higher Functional (Meth)acrylate)

The non-cyclic tri- or higher functional (meth)acrylate is preferably a trifunctional to pentafunctional (meth)acrylate, more preferably a trifunctional or tetrafunctional (meth) acrylate, and still more preferably a trifunctional (meth) acrylate. Specific examples of the non-cyclic tri- or higher functional (meth)acrylate include pentaerythritol tri(meth) acrylate, pentaerythritol tetra(meth)acrylate, dipentaerythritol tetra(meth)acrylate, trimethylolethane tri(meth)acrylate, trimethylolpropane tri(meth)acrylate, ditrimethylolpropane tetra(meth)acrylate, tetramethylolmethane tetra(meth)acrylate, and tetramethylolmethane tri(meth)acrylate. The molecular weight of the non-cyclic tri- or higher functional (meth)acrylate can be, for example, in the range of 200 to 400, but is not limited to this range. The non-cyclic tri- or higher functional (meth)acrylate may contain, as a (meth) acryloyl group, only an acryloyl group, only a methacryloyl group, or an acryloyl group and a methacryloyl group. In an aspect, the non-cyclic tri- or higher functional (meth)acrylate preferably contains only a methacryloyl group as a (meth)acryloyl group, that is, the non-cyclic tri- or higher functional (meth)acrylate is preferably methacrylate.

(Another (Meth)acrylate)

The composition can contain, as a (meth)acrylate, one or two or more alicyclic difunctional (meth)acrylates, and can contain one or two or more non-cyclic tri- or higher functional (meth)acrylates. The composition may or may not contain one or more other (meth)acrylates in addition to these (meth)acrylates. The other (meth)acrylate can be used, for example, for adjusting the viscosity of the composition. The other (meth)acrylate can be, for example, a non-cyclic or cyclic di- or higher functional (meth)acrylate. The other (meth)acrylate can be a difunctional to pentafunctional (meth)acrylate, preferably a difunctional to tetrafunctional (meth)acrylate, more preferably a difunctional or trifunctional (meth)acrylate, and still more preferably a difunctional (meth)acrylate. The molecular weight of the other (meth)acrylate can be, for example, in the range of 150 to 350, but is not limited to this range.

In an aspect, the other (meth)acrylate can be a non-cyclic difunctional (meth)acrylate. Specific examples thereof include neopentyl glycol di(meth)acrylate, ethoxylated neopentyl glycol di(meth)acrylate, propoxylated neopentyl glycol di(meth)acrylate, 1,6-hexanediol di(meth)acrylate, 1,9-nonanediol di(meth)acrylate, 1,10-decanediol diacrylate, ethylene glycol di(meth)acrylate, diethylene glycol di(meth) acrylate, triethylene glycol di(meth)acrylate, tetraethylene glycol di(meth)acrylate, polyethylene glycol di(meth)acrylate, and polypropylene glycol di(meth)acrylate.

The content of the alicyclic difunctional (meth)acrylate is preferably 50 mass % or more, more preferably 55 mass % or more, and still more preferably 60 mass % or more when the total amount of the two or more (meth)acrylates contained in the composition is 100 mass %. The content of the alicyclic difunctional (meth)acrylate can be, for example, 80 mass % or less, and can be more than 80 mass %. Meanwhile, the content of the non-cyclic tri- or higher functional (meth)acrylate is preferably 5 mass % or more, more preferably 7 mass % or more, and still more preferably 10 mass % or more when the total amount of the two or more (meth)acrylates contained in the composition is 100 mass %. The content of the non-cyclic tri- or higher functional (meth)acrylate is preferably 20 mass % or less, and more preferably 15 mass % or less. The total content of the alicyclic difunctional (meth)acrylate and the non-cyclic tri- or higher functional (meth)acrylate is preferably 55 mass % or more, more preferably 60 mass % or more, still more preferably 65 mass % or more, and still even more preferably 70 mass % or more when the total amount of the two or more (meth)acrylates contained in the composition is 100 mass %. In addition, the total content of the alicyclic difunctional (meth)acrylate and the non-cyclic tri- or higher functional (meth)acrylate can be, for example, 90 mass % or less, and also 85 mass % or less. Meanwhile, the content of the other (meth)acrylate other than the alicyclic difunctional (meth)acrylate and the non-cyclic tri- or higher functional (meth)acrylate can be 0 mass % or may be more than 0 mass % when the total amount of the two or more (meth)acrylates contained in the composition is 100 mass %. When the other (meth)acrylate is contained in the composition, the content thereof is preferably 3 mass % or more, more preferably 5 mass % or more, still more preferably 7 mass % or more, and more preferably 10 mass % or more, when the total amount of the two or more (meth)acrylates contained in the composition is 100 mass %. The content of the other (meth) acrylate is preferably 40 mass % or less, more preferably 35 mass % or less, and still more preferably 30 mass % or less. In addition, the composition can contain the (meth)acrylate at a content of, for example, 80 to 99.9 mass % relative to 100 mass % of the total amount of the composition.

<Photochromic Compound>

The composition contains a photochromic compound together with the two or more (meth)acrylates. As the photochromic compound contained in the composition, a known compound exhibiting photochromic properties can be used. The photochromic compound can exhibit photochromic properties against, for example, ultraviolet rays. Examples of the photochromic compound include compounds having a known skeleton exhibiting photochromic properties, such as a fulgimide compound, a spirooxazine compound, a chromene compound, and an indeno-fused naphthopyran compound. The photochromic compound can be used singly or in combination of two or more thereof. The content of the photochromic compound of the composition can be, for example, approximately 0.1 to 15 mass % relative to 100 mass % of the total amount of the composition, but is not limited to this range.

<Optional Component>

Since the (meth)acrylate described above is a curable compound, the composition containing the (meth)acrylate can be a curable composition, and can be cured to form a cured layer when subjected to a curing treatment. The composition can contain a polymerization initiator for initiating a curing reaction (also referred to as a polymerization reaction). As the polymerization initiator, a known polymerization initiator such as a photopolymerization initiator or a thermal polymerization initiator can be used according to the type of the curing reaction. The amount of the polymerization initiator used may be determined according to the polymerization condition, the type of the polymerization initiator, and the type of the curable compound contained in the curable composition.

To the composition, known additives that can be added to the composition containing the photochromic compound, for example, additives such as a surfactant, an antioxidant, a radical scavenger, a photostabilizer, an ultraviolet absorber, a coloring inhibitor, an antistatic agent, a fluorescent dye, a dye, a pigment, a fragrance, a plasticizer, and a silane coupling agent can be further added in any amounts. As these additives, known compounds can be used.

The composition can be prepared by mixing the various components described above simultaneously or sequentially in any order.

The composition is a coating composition for an optical article. The coating composition for an optical article means a composition applied to a substrate or the like for producing an optical article. Examples of the optical article include various lenses, and preferably include a spectacle lens. A spectacle lens produced by applying the composition to a lens substrate has a photochromic layer, and can exhibit photochromic properties.

[Spectacle Lens and Method for Producing Spectacle Lens]

An aspect of the present invention relates to
a spectacle lens including:
a lens substrate; and
a photochromic layer formed by curing the composition, and
a method for producing a spectacle lens, including:
applying the composition onto the lens substrate; and
subjecting the applied composition to a curing treatment to form a photochromic layer. Hereinafter, the spectacle lens and the method for producing a spectacle lens will be described in more detail.

<Lens Substrate>

The lens substrate included in the spectacle lens can be a plastic lens substrate or a glass lens substrate. The glass lens substrate can be, for example, a lens substrate made of inorganic glass. As the lens substrate, a plastic lens substrate is preferable from the viewpoint of being light, hardly broken, and easy to handle. Examples of the plastic lens substrate include a styrene resin including a (meth)acrylic resin, a polycarbonate resin, an allyl resin, an allyl carbonate resin such as diethyleneglycol bis(allylcarbonate) resin (CR-39), a vinyl resin, a polyester resin, a polyether resin, a urethane resin obtained through reaction between an isocyanate compound and a hydroxy compound such as diethylene glycol, a thiourethane resin obtained through reaction between an isocyanate compound and a polythiol compound, and a cured product (generally referred to as a transparent resin) obtained by curing a curable composition containing a (thio) epoxy compound having one or more intermolecular disulfide bonds. The lens substrate may be undyed (a colorless lens) or dyed (a dyed lens). The refractive index of the lens substrate can be, for example, approximately 1.60 to 1.75. Provided that the refractive index of the lens substrate is not limited to the above range, but may be within the above range or deviate therefrom. In the present invention and the present specification, the refractive index refers to a refractive index with respect to light having a wavelength of 500 nm. In addition, the lens substrate may be a lens having power (so-called prescription lens) or a lens having no power (so-called plain glass lens).

The spectacle lens can be various lenses such as a single-vision lens, a multifocal lens, and a progressive addition lens. The type of the lens is determined depending on the shapes of both surfaces of the lens substrate. Furthermore, the surface of the lens substrate may be a convex surface, a concave surface, or a flat surface. In a common lens substrate and spectacle lens, the object-side surface is a convex surface, and the eyeball-side surface is a concave surface. However, the present invention is not limited thereto. The photochromic layer can be usually provided on the object-side surface of the lens substrate, but may be provided on the eyeball-side surface.

The photochromic layer formed using the composition may be directly provided on the surface of the lens substrate, or may be indirectly provided with one or more other layers interposed between the photochromic layer and the lens substrate. Examples of the other layer include a primer layer for improving adhesion between the photochromic layer and the lens substrate. Such a primer layer is known.

<Photochromic Layer>

The photochromic layer of the spectacle lens can be formed by applying the composition onto the surface of the lens substrate directly or indirectly with one or more other layers interposed between the photochromic layer and the lens substrate, and subjecting the applied composition to a curing treatment. As a coating method, a known coating method such as a spin coating method or a dip coating method can be employed. The spin coating method is preferable from the viewpoint of uniformity of coating. The curing treatment can be light irradiation and/or heat treatment. Light irradiation is preferable from the viewpoint of allowing the curing reaction to proceed in a short time. The curing treatment condition may be determined according to the types of various components ((meth)acrylate, polymerization initiator, and the like described above) contained in the composition and the constitution of the composition. The thickness of the photochromic layer thus formed is, for example, preferably in the range of 5 to 80 μm, and more preferably in the range of 20 to 60 μm.

The spectacle lens having the photochromic layer may or may not have one or more functional layers in addition to the photochromic layer. Examples of the functional layer include layers known as functional layers of a spectacle lens, such as a hard coat layer, an antireflective layer, a water-repellent or hydrophilic antifouling layer, and an antifogging layer.

[Spectacles]

An aspect of the present invention relates to spectacles including the spectacle lens. Details of the spectacle lens included in the spectacles are as described above. Spectacles including such a spectacle lens can exhibit an anti-glare effect like sunglasses, provided by the photochromic compound contained in the photochromic layer developing color upon receiving sunlight irradiation in outdoors, for example, and can also recover transparency due to discoloration of the photochromic compound when returning to indoors. A known technique can be applied to the configuration of a frame or the like of the above spectacles.

[Optical article and method for producing optical article]

An aspect of the present invention relates to
an optical article including:
a substrate; and
a photochromic layer formed by curing the composition, and
a method for producing an optical article, including:
applying the composition onto the substrate; and
subjecting the applied composition to a curing treatment to form a photochromic layer.

An aspect of the optical article is the spectacle lens described above. In addition, examples of an aspect of the optical article include a goggle lens, a visor (eaves) portion of a sun visor, a shield member of a helmet, and the like. An optical article having an anti-glare function can be obtained by applying the above composition onto the substrate for these optical articles and subjecting the applied composition to a curing treatment to form a photochromic layer.

EXAMPLES

Hereinafter, the present invention will be further described based on examples. However, the present invention is not limited to aspects illustrated in the examples.

Example 1

<Preparation of Coating Composition for Optical Article>

In a plastic container, 68 mass % (relative to 100 mass % of the total of (meth)acrylates) of tricyclodecane dimethanol dimethacrylate (alicyclic difunctional (meth)acrylate), 12 mass % of trimethylolpropane trimethacrylate (non-cyclic trifunctional (meth)acrylate), and 20 mass % of neopentyl glycol dimethacrylate (another (meth)acrylate) were mixed to prepare a (meth)acrylate mixture. To this (meth)acrylate mixture, a photochromic compound (indeno-fused naphthopyran compound represented by the structural formula described in U.S. Pat. No. 5,645,767 B), a photopolymerization initiator (phenyl bis(2,4,6-trimethylbenzoyl)phosphine oxide), an antioxidant (bis[3-(3-tert-butyl-4-hydroxy-5-methylphenyl)propionate][ethylene bis(oxyethylene)]), and a photostabilizer (bis(1,2,2,6,6-pentamethyl-4-piperidyl)sebacate) were mixed and sufficiently stirred, and then a silane coupling agent (γ-methacryloxypropyltrimethoxysilane) was added dropwise with stirring. Thereafter, the resultant was defoamed by an automatic planetary stirring defoaming device.

A coating composition for an optical article having the composition shown in Table 1 below was prepared by the above method.

TABLE 1

| Component | Content (mass %) |
|---|---|
| Alicyclic difunctional (meth)acrylate | 58.97 |
| Non-cyclic trifunctional (meth)acrylate | 10.41 |
| Another (meth)acrylate | 17.35 |
| Photochromic compound | 2.60 |
| Photopolymerization initiator | 0.26 |
| Antioxidant | 2.60 |
| Photostabilizer | 2.60 |
| Silane coupling agent | 5.20 |

<Production of Spectacle Lens>

A plastic lens substrate (product name EYAS, manufactured by HOYA Corporation; center wall thickness: 2.5 mm, radius: 75 mm, S: −4.00) was immersed in a 10 mass % aqueous sodium hydroxide solution (liquid temperature: 60° C.) for 5 minutes, then washed with pure water, and dried. Thereafter, a primer layer was formed on the convex surface (object-side surface) of the plastic lens substrate. Specifically, an aqueous polyurethane resin liquid (polycarbonate polyol-based polyurethane emulsion; viscosity: 100 CPS, solid content concentration: 38 mass %) was applied to the convex surface of the plastic lens substrate by a spin coating method in an environment of a temperature of 25° C. and a relative humidity of 50%, and then naturally dried for 15 minutes to form a primer layer having a thickness of 5.5 μm.

The composition prepared above was applied onto the primer layer by a spin coating method. The spin coating was performed by the method described in JP 2005-218994 A. Thereafter, the composition applied onto the plastic lens substrate was irradiated with ultraviolet rays (wavelength: 405 nm) in a nitrogen atmosphere (oxygen concentration: 500 ppm or less) to cure the composition, thereby forming a photochromic layer. The thickness of the formed photochromic layer was 45 μm.

For each of Examples and Comparative Examples, a plurality of spectacle lenses in which the degree of progress of the curing reaction of the photochromic layer was changed by changing the light irradiation time were produced.

Example 2

A spectacle lens having a photochromic layer was produced in the same manner as in Example 1 except that the alicyclic difunctional (meth)acrylate was changed to tricyclodecane dimethanol diacrylate.

Example 3

A spectacle lens having a photochromic layer was produced in the same manner as in Example 1 except that neopentyl glycol dimethacrylate was not used.

Comparative Example 1

A spectacle lens having a photochromic layer was produced in the same manner as in Example 1 except that ethoxylated bisphenol A dimethacrylate 2,2-bis[4-(methacryloxypolyethoxy)phenyl]propane (EO 10 mol)) was used instead of the alicyclic difunctional (meth) acrylate.

Comparative Example 2

A spectacle lens having a photochromic layer was produced in the same manner as in Example 1 except that polyethylene glycol diacrylate (molecular weight: 508) was used instead of the alicyclic difunctional (meth)acrylate.
[Evaluation Method]
<Color Density>

The color density was evaluated by the following method according to JIS T7333:2005.

The surface of photochromic layer of each of the spectacle lenses of Examples and Comparative Examples was irradiated with light using a xenon lamp through an air mass filter for 15 minutes (900 seconds) to cause a photochromic compound in the photochromic layer to develop color. The transmittance (measurement wavelength: 550 nm) at the time of color development was measured by a spectrophotometer manufactured by Otsuka Electronics Co., Ltd. The light irradiation was performed so that the irradiance and tolerance of the irradiance were values shown in the following Table 2 as specified in JIS T7333:2005.

TABLE 2

| Wavelength range (nm) | Irradiance (W/m$^2$) | Tolerance of irradiance (W/m$^2$) |
| --- | --- | --- |
| 300 to 340 | <2.5 | — |
| 340 to 380 | 5.6 | ±1.5 |
| 380 to 420 | 12 | ±3.0 |
| 420 to 460 | 12 | ±3.0 |
| 460 to 500 | 26 | ±2.6 |

A smaller value of the transmittance measured above means that the photochromic compound develops color at a high density.

FIG. 1 shows a graph in which the transmittance obtained as described above is plotted with respect to the light irradiation time at the time of forming the photochromic layer as the evaluation results of color density.
<Photoresponsiveness (Fading Rate)>

The photoresponsiveness (fading rate) was evaluated by the following method.

The transmittance (measurement wavelength: 550 nm) of each of the spectacle lenses of Examples and Comparative Examples before light irradiation (undeveloped state) was measured by a spectrophotometer manufactured by Otsuka Electronics Co., Ltd. The transmittance measured here is referred to as "initial transmittance".

The surface of the photochromic layer of each of the spectacle lenses of Examples and Comparative Examples was irradiated with light using a xenon lamp through an air mass filter for 15 minutes (900 seconds) to cause a photochromic compound in the photochromic layer to develop color. The transmittance at color development was measured in the same manner as described above.

Thereafter, the time (half-life) required from the time when the light irradiation was stopped until the transmittance reached [(initial transmittance−transmittance at color development)/2] was measured. A smaller value of the half-life measured in this way is determined to exhibit high fading rate and excellent photoresponsiveness.

The hardness (Martens hardness) of the photochromic layer of the spectacle lens after the evaluation was measured by the following method. The degree of progress of the curing reaction of the photochromic layer can be determined by the hardness of the photochromic layer, and a harder photochromic layer is determined as better progress of the curing reaction.

Using an ultra-micro indentation hardness tester ENT-2100, manufactured by ELIONIX INC., an indenter was pressed against the surface of the photochromic layer with a load of 100 mgf, and the surface area where the indenter penetrated at this time was measured from the indentation depth. The Martens hardness (kgf/mm$^2$) was determined as "load/surface area where the indenter penetrated".

Figure 2:
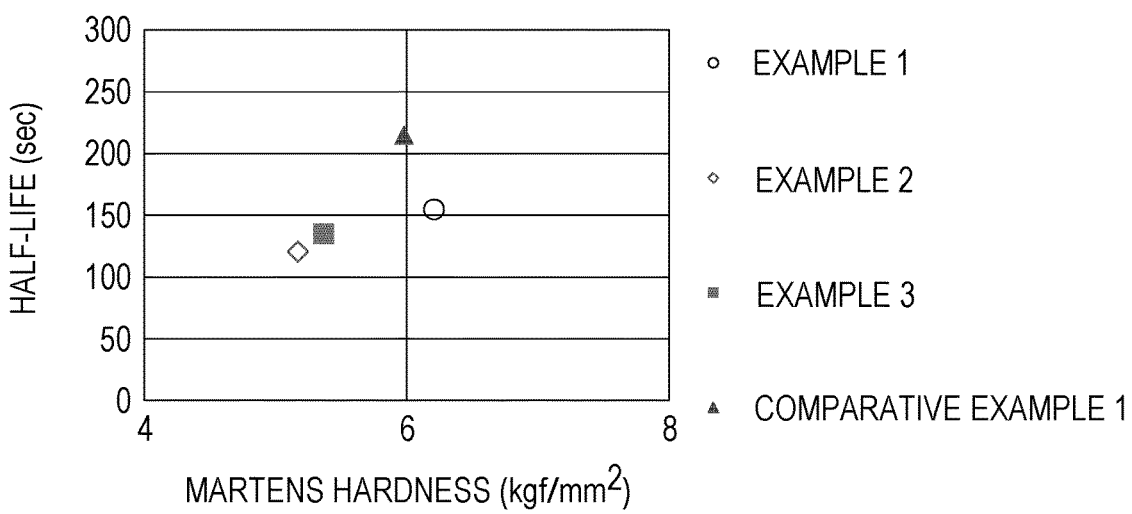
FIG. 2 shows evaluation results of photoresponsiveness (fading rate) in Examples 1 to 3 and Comparative Example 1.

FIG. 2 shows a graph in which the half-life is plotted with respect to the Martens hardness obtained as described above as the evaluation results of photoresponsiveness (fading rate) for each of the photochromic layers of Examples 1 to 3 and Comparative Example 1.

The results shown in FIG. 1 demonstrate that the spectacle lenses of Examples 1 to 3 and Comparative Example 1 are superior to the spectacle lens of Comparative Example 2 in terms of color density.

On the other hand, comparing Examples 1 to 3 with Comparative Example 1 in terms of photoresponsiveness (fading rate), the spectacle lenses of Examples 1 to 3 have a smaller half-life value at the same hardness than that of Comparative Example 1, and thus is excellent in photoresponsiveness, as shown in FIG. 2.

The above results show that the spectacle lenses of Examples 1 to 3 have high color density of the photochromic compound contained in the photochromic layer, and is excellent in photoresponsiveness.

Figure 3:
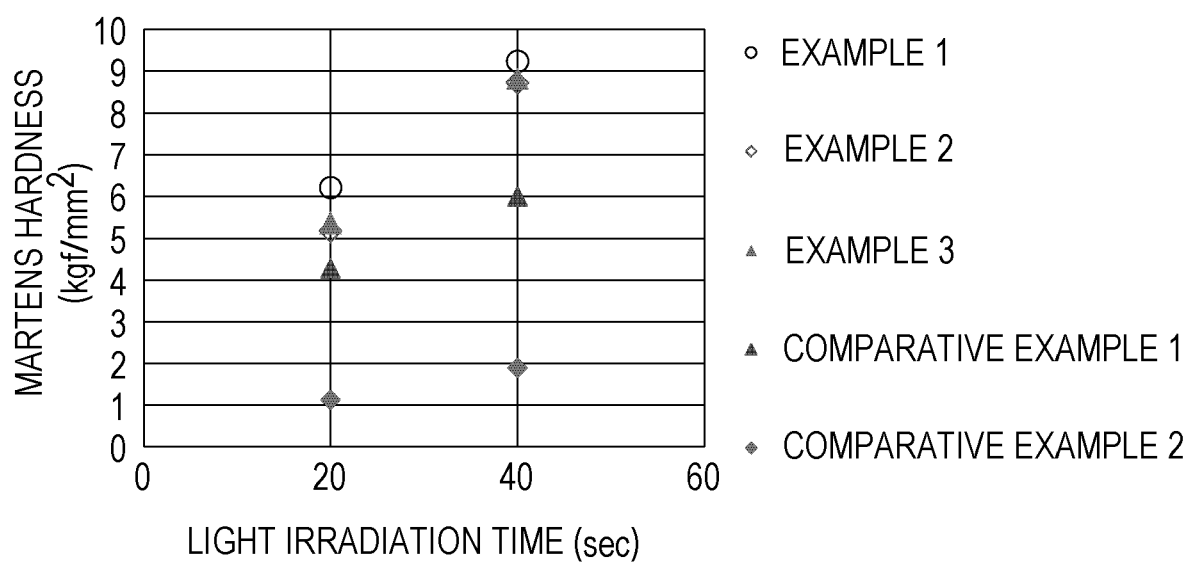
FIG. 3 shows evaluation results of curability in Examples and Comparative Examples.

FIG. 3 is a graph in which the Martens hardness measured as described above is plotted with respect to the light irradiation time at the time of forming the photochromic layer as the evaluation results of curability for each of the spectacle lenses of Examples and Comparative Examples. The results shown in FIG. 3 demonstrate that the spectacle lenses of Examples 1 to 3 exhibited higher Martens hardness of the photochromic layer at the same light irradiation time than that of the spectacle lenses of Comparative Examples 1 and 2. This result shows that combined use of an alicyclic difunctional (meth)acrylate and a non-cyclic tri- or higher functional (meth)acrylate as the (meth)acrylate is preferable in view of forming a photochromic layer having high hardness.

Finally, the above described aspects will be summarized.

According to an aspect, there is provided a coating composition for an optical article containing a photochromic compound and two or more (meth)acrylates, the two or more (meth)acrylates containing an alicyclic difunctional (meth) acrylate and a non-cyclic tri- or higher functional (meth) acrylate.

According to the coating composition for an optical article, a photochromic layer having excellent photoresponsiveness and capable of developing color at a high density can be formed.

In an aspect, the two or more (meth)acrylates can further contain a non-cyclic difunctional (meth)acrylate.

In an aspect, the composition can contain the alicyclic difunctional (meth)acrylate in an amount of 50 mass % or more relative to the total amount of the two or more (meth)acrylates.

In an aspect, the alicyclic difunctional (meth)acrylate can be methacrylate.

According to an aspect, there is provided a spectacle lens including a lens substrate and a photochromic layer formed by curing the composition.

The spectacle lens can have a photochromic layer having excellent photoresponsiveness and capable of developing color at a high density.

According to an aspect, spectacles including the spectacle lens are provided.

According to an aspect, there is provided an optical article including a substrate and a photochromic layer formed by curing the composition.

According to an aspect, there is provided a method for producing an optical article, including applying the composition onto a substrate and subjecting the applied composition to a curing treatment to form a photochromic layer.

According to the above production method, an optical article having an anti-glare function can be provided.

In an aspect, the optical article can be a spectacle lens, a goggle lens, a visor portion of a sun visor, a shield member of a helmet, and the like.

The various aspects described in this specification can be combined in two or more in any combination.

The embodiment disclosed herein is an example in every respect and should not be restrictively understood. The scope of the present invention is defined not by the above description but by claims, and intends to include all modifications within meaning and a scope equal to claims.

INDUSTRIAL APPLICABILITY

The present invention is useful in the technical field of spectacles, goggles, sun visors, helmets, and the like.

The invention claimed is:

1. A coating composition for an optical article, comprising:
   a photochromic compound; and
   two or more (meth)acrylates, wherein the two or more (meth)acrylates contain an alicyclic difunctional (meth) acrylate, and a non-cyclic tri- or higher functional meth) acrylate, wherein
   the alicyclic difunctional (meth)acrylate is a compound having a structure represented by $R^1$-$(L^1)n1$-$Q$-$(L^2)n2$-$R^2$,
   Q represents a divalent alicyclic group,
   $R^1$ and $R^2$ each independently represent a (meth) acryloyl group or a (meth)acryloyloxy group,
   $L^1$ and $L^2$ each independently represent a linking group, the linking group is an alkylene group having 3 to 6 carbon atoms, and
   n1 and n2 are each 1.

2. The coating composition for an optical article according to claim 1, wherein the two or more (meth)acrylates further contain a non-cyclic difunctional (meth)acrylate.

3. The coating composition for an optical article according to claim 1, wherein the coating composition contains the alicyclic difunctional (meth)acrylate in an amount of 50 mass % or more relative to a total amount of the two or more (meth)acrylates.

4. The coating composition for an optical article according to claim 1, wherein the alicyclic difunctional (meth) acrylate is alicyclic difunctional methacrylate.

5. A spectacle lens comprising:
   a lens substrate; and
   a photochromic layer formed by curing the coating composition for an optical article according to claim 1.

6. Spectacles comprising the spectacle lens according to claim 5.

7. An optical article comprising:
   a substrate; and
   a photochromic layer formed by curing the coating composition for an optical article according to claim 1.

8. The optical article according to claim 7, wherein the optical article is a goggle lens.

9. The optical article according to claim 7, wherein the optical article is a visor portion of a sun visor.

10. The optical article according to claim 7, wherein the optical article is a shield member of a helmet.

11. A method for producing an optical article, comprising:
    applying the coating composition for an optical article according to claim 1 onto a substrate; and
    subjecting the applied coating composition for an optical article to a curing treatment to form a photochromic layer.

12. The method for producing an optical article according to claim 11, wherein the optical article is a spectacle lens.

13. The method for producing an optical article according to claim 11, wherein the optical article is a goggle lens.

14. The method for producing an optical article according to claim 11, wherein the optical article is a visor portion of a sun visor.

15. The method for producing an optical article according to claim 11, wherein the optical article is a shield member of a helmet.

* * * * *